(12) United States Patent  
Poupyrev et al.

(10) Patent No.: US 8,330,590 B2  
(45) Date of Patent: Dec. 11, 2012

(54) USER INTERFACE FEEDBACK APPARATUS, USER INTERFACE FEEDBACK METHOD, AND PROGRAM

(75) Inventors: Ivan Poupyrev, Tokyo (JP); Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 561 days.

(21) Appl. No.: 12/571,882

(22) Filed: Oct. 1, 2009

(65) Prior Publication Data

US 2010/0085169 A1    Apr. 8, 2010

(30) Foreign Application Priority Data

Oct. 2, 2008    (JP) ................................ P2008-257629

(51) Int. Cl.  
    *G08B 6/00*    (2006.01)
(52) U.S. Cl. .............. 340/407.2; 340/538.16; 340/691.2
(58) Field of Classification Search ............... 340/407.2, 340/538.16, 691.2, 429, 428, 515, 514, 525, 340/530, 535, 545.4, 562, 686.6, 691.6, 692, 340/691.7  
See application file for complete search history.

(56) References Cited

U.S. PATENT DOCUMENTS

| | | | |
|---|---|---|---|
| 6,959,484 B1* | 11/2005 | Spangler et al. | 29/709 |
| 7,215,329 B2* | 5/2007 | Yoshikawa et al. | 345/173 |
| 7,924,144 B2* | 4/2011 | Makinen et al. | 340/407.2 |
| 2001/0025917 A1* | 10/2001 | Asada et al. | 250/221 |
| 2007/0046643 A1* | 3/2007 | Hillis et al. | 345/173 |
| 2008/0278588 A1* | 11/2008 | Greenberg | 348/207.99 |

FOREIGN PATENT DOCUMENTS

| | | |
|---|---|---|
| JP | 2003-248540 | 9/2003 |
| JP | 2003-288158 | 10/2003 |
| JP | 2003-330611 | 11/2003 |
| JP | 2004-21528 | 1/2004 |
| JP | 2006-12184 | 1/2006 |

OTHER PUBLICATIONS

M. Yoshie et al., "Development of Non-grounded Force Display Using Gyro Moment", Proceeding of Human Interface Society Meeting, pp. 25-30 (2001).  
Y. Fukui et al, "Hand-Held Torque Feedback Device", Proceedings of SIGGRAPH01 Abstract and Applications, 1 page (2001).  
R. Hughes et al., "Perceptualisation using a Tactile Mouse", Visualization, IEEE, pp. 181-188 and 483 (1996).  
M. Fukumoto et al., "Active Click: Tactile Feedback for Touch Panels", CHI 2001, pp. 121-122 (2001).  
I. Poupyrev et al., "Ambient Touch: Designing Tactile Interfaces for Handheld Devices", UIST, ACM, 10 pages (2002).

(Continued)

*Primary Examiner* — Daniel Previl  
(74) *Attorney, Agent, or Firm* — Finnegan, Henderson, Farabow, Garrett & Dunner, L.L.P.

(57) ABSTRACT

A user interface feedback apparatus includes an operable element, a sensor, a processing unit, and a tactile control module. The operable element has a two-layer structure made up of a conductor and an insulator. The sensor detects, in the form of user contact information, at least a user contact position with respect to the insulator of the operable element. The processing unit acquires the detected information from the sensor, and determines parameters for an electrical signal to be output to the conductor. The tactile control module controls the frictional force between the insulator and the user by outputting to the conductor an electrical signal regulated by the parameters determined by the processing unit.

14 Claims, 12 Drawing Sheets

OTHER PUBLICATIONS

I. Poupyrev et al., "Tactile Interfaces for Small Touch Screens", UIST, ACM, 4 pages (2003).

S. Frisken-Gibson et al, "A 64-Solenoid, Four-Level Fingertip Search Display for the Blind", IEEE Transactions on Biomedical Engineering, vol. BME-34, No. 12, pp. 963-965 (1987).

M. Shinohara et al., "Three-Dimensional Tactile Display for the Blind", IEEE Transactions on Rehibilitation Engineering, vol. 6, No. 3, pp. 249-256 (1998).

I. Poupyrev et al., Actuation and Tangible User Interfaces: the Vaucanson Duck, Robots, and Shape Displays, ACM, 8 pages (2007).

R. Cholewiak et al, "A computer-controlled matrix system for presentation to the skin of complex spatiotemporal patterns", Behavior Research Methods & Instrumentation, vol. 13, No. 5, pp. 667-673 (1981).

H. Kajimoto et al., "Electrocutaneous Display as an Interface to a Virtual Tactile World", IEEE, pp. 289-291 (2001).

K. Kaczmarek et al., "Tactile Displays", Advanced Interface Design, Oxford University Press, pp. 349-414 (1995).

E. Mallinckrodt, et al., "Perception by the Skin of Electrically Induced Vibrations", Science, vol. 118, No. 3062, pp. 277-278 (1953).

R. Strong, et al., "An Electrotactile Display", IEEE Transactions on Man-Machine Systems, vol. MMI-11, No. 1, pp. 72-79 (1970).

H. Tang et al., "A Microfabricated Electrostatic Haptic Display for Persons with Visual Impairments", IEEE Transactions in Rehabilitation Engineering, vol. 6, No. 3, pp. 241-248 (1998).

A. Yamamoto, et al., "Electrostatic Tactile Display with Thin Film Slider and its Applications to Tactile Telepresentation Systems", IEEE Transactions on Visualization and Computer Graphics, vol. 12, No. 2, pp. 168-177 (2006).

* cited by examiner

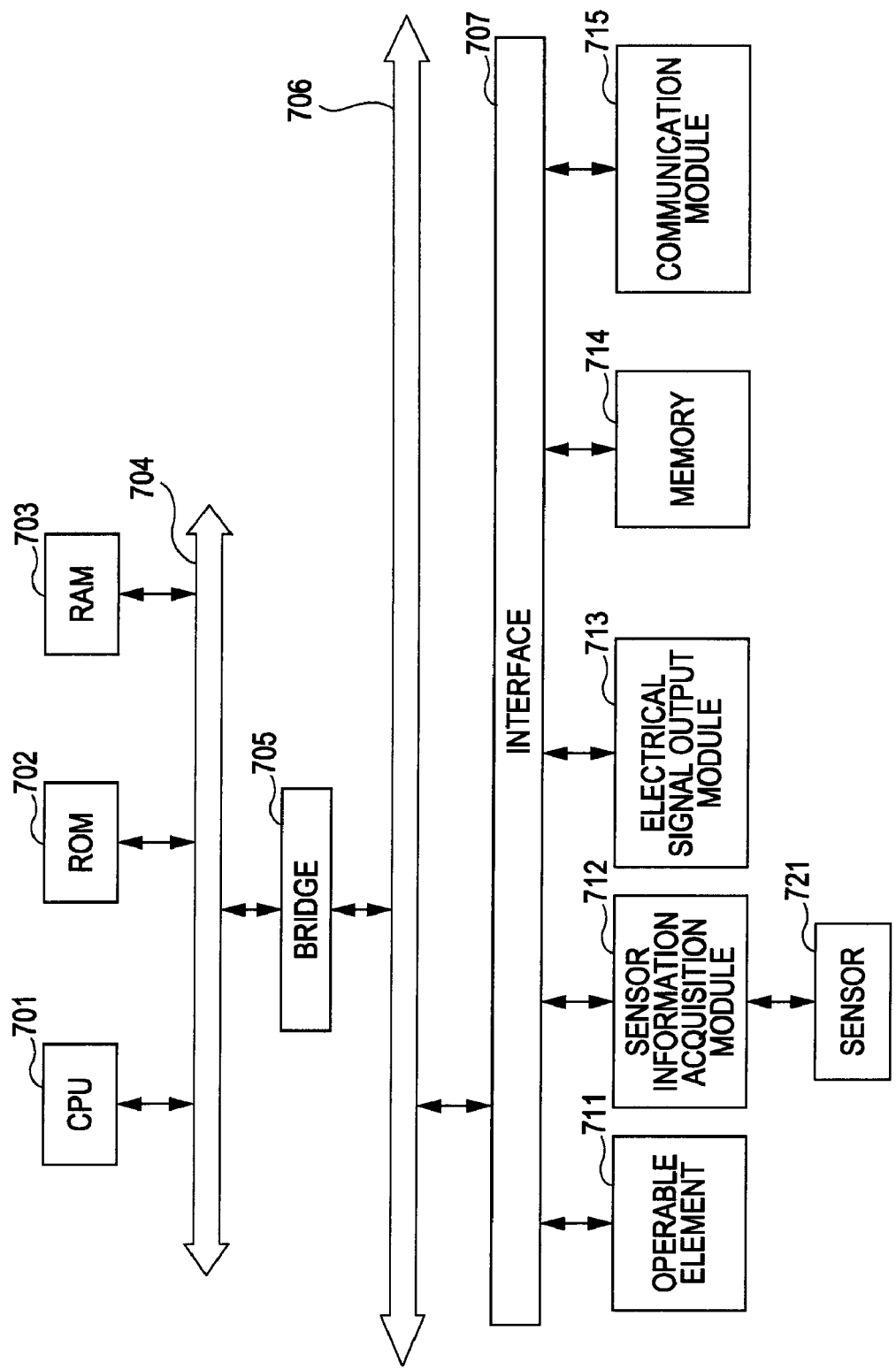

USER INTERFACE FEEDBACK APPARATUS, USER INTERFACE FEEDBACK METHOD, AND PROGRAM

BACKGROUND OF THE INVENTION

1. Field of the Invention

The present invention relates to a user interface feedback apparatus, a user interface feedback method, and a program therefor. More particularly, the present invention relates to a user interface feedback apparatus, a user interface feedback method, and a program able to provide user interface feedback in the form of a tactile response when the user operates a switch or similar operable element displayed on a touch panel, for example.

2. Description of the Related Art

Currently, user interfaces are being used in a variety of fields wherein switches or similar operable elements are displayed on a liquid-crystal display or other type of touch panel, the switches being operable by the user's fingertips. Such touch panel interfaces are configured to display switches, buttons, sliders, dials, or other elements as images, and subsequently execute predetermined processing when contact with the user's fingertip is detected with respect to a particular screen display region.

However, when operating such an interface, the user does not receive the same tactile response experienced when physically moving an actual switch or slider. To address this issue, there have been proposed interfaces that provide user interface feedback by producing resistance, vibration, or a sound replicating the response of an actual switch. Such interfaces are referred to as tactile interfaces, and are described in Japanese Unexamined Patent Application Publication Nos. 2003-330611, 2004-21528, and 2003-288158, for example.

As an example, one tactile interfaces involves installing piezoelectric actuators around a touch panel. When the user presses an operable button on the touch panel, vibrations and sounds are produced, thereby providing user interface feedback similar to that of physically operating an actual button.

The following three categories exemplify the types of tactile interfaces that provide user interface feedback.

(1) Vibrotactile devices
(2) Two-dimensional (2D) tactile displays and matrices
(3) Electrical stimulation devices The above interface types are summarized below.

(1) Vibrotactile Devices

Interface devices that produce vibrations or similar effects in response to user operations are referred to as vibrotactile devices. Vibrotactile devices are configured to produce vibrations corresponding to contact with the user's fingertips, for example, with the use of actuators or similar elements that convert an electrical signal into vibration.

A torque-based tactile feedback device is one example of a vibrotactile device. A torque-based tactile feedback device creates feedback from the torque produced when starting or stopping the rotation of a motor, which is then felt by the user as user interface feedback. (See for example: M. Yoshie, H. Yano, H. Iwata, "Development of non-grounded force display using gyro moments," Proceedings of Human Interface Society Meeting, 2001, pp. 25-30; and Y. Fukui, S. Nishihara, K. Nakamura, J. Yamashita, "Hand-held torque feedback display," Proceedings of SIGGRAPH01 Abstract and Applications, 2001, ACM, p. 192.)

However, with such a configuration, the production of sufficient torque involves incorporating a motor of comparable size, which is difficult to install in a compact portable device. Moreover, a configuration using such a motor is only able to provide feedback following specific patterns, and might not be able to produce arbitrary patterns. It is also difficult to suddenly stop the output of feedback from the device once started.

Many of the vibration motors used in devices such as mobile phones and game controllers are provided with asymmetric axes or cams. Vibration is thus initiated from such a configuration after a fixed delay time. Since the actuators exhibit a considerably large latency, the above configuration is ill-suited to interactive applications.

In addition, piezo actuators, voice coils, and magnetic actuators such as solenoids are also used as elements for vibrating the entire device and directly stimulating the user's hand, for example. (See for example: R. Hughes and A. Forrest, "Perceptualisation using a tactile mouse," Visualization '96, IEEE, 1996; M. Fukumoto and S. Toshiaki, "ActiveClick: Tactile feedback for touch panels," CHI'2001, Extended Abstracts, ACM, 2001; I. Poupyrev, S. Maruyama et al., "Ambient Touch: Designing tactile interfaces for handheld devices," UIST'2002, ACM, 2002; and I. Poupyrev and S. Maruyama, "Tactile interfaces for small touch screens," UIST, ACM, 2003.)

(2) Two-Dimensional (2D) Tactile Displays and Matrices

Currently there exist tactile displays premised on a matrix provided with a plurality of pins. The user's hand is then affected by the action of the pins. There are two types of such displays. The first type forms a three-dimensional relief by moving the pins in the vertical direction (see for example: S. Frisken-Gibson, P. Bach-y-Rita et al., "A 64-solenoid, four-level fingertip search display for the blind," IEEE Transactions on Biomedical Engineering BME-34(12): 963-965, 1987; M. Shinohara, Y. Shimizu et al., "Three-dimensional tactile display for the blind," IEEE Transactions on Rehabilitation Engineering 6(3): 249-255, 1998; and I. Poupyrev, T. Nashida et al., "Actuation and Tangible User Interfaces: the Vaucanson Duck, Robots, and Shape Displays," Tangible and Embedded Interaction, ACM: 205-212, 2007). The second type causes the pins to vibrate in both the horizontal and the vertical directions (see, for example, R. Cholewiak and C. Sherrick, "A computer-controlled matrix system for presentation to skin of complex spatiotemporal patterns," Behavior Research Methods and Instrumentation 13(5): 667-673, 1981). However, the above configurations are also comparatively large in size, and it is difficult to incorporate such configurations into compact portable devices.

(3) Electrical Stimulation Devices

Electrical stimulation devices have also been proposed, which transmit user interface feedback by causing a weak electric current to flow into the user's hand, for example. For example, such a device may be configured to stimulate the user by means of electrodes arranged in a matrix pattern (see for example: H. Kajimoto, N. Kawakami et al., "Electrocutaneous display as an interface to a virtual tactile world," VR'2001, IEEE, 2001; and K. Kaczmarek and P. Bach-y-Rita, "Tactile displays," Virtual Environments and Advanced Interface Design, ed. by W. Barfield and T. A. Furness, Oxford Univ. Press, Oxford: 349-414, 1995). However, the configuration of such electrical stimulation devices is such that, for many users, the electrical stimulation feels uncomfortable. Furthermore, there is a problem in that the discomfort remains even after removing the current.

[Electrovibrotactile Displays]

Electrovibrotactile displays will now be described. An electrovibrotactile display is a device that utilizes a skin-attracting effect whereby the skin of a person's hand or fingertips is attracted as a result of applying intermittent voltage to an electrically insulated surface. This physical phenomenon was unexpectedly discovered in 1953 by Mallinckrodt, Hughes et al. (see, for example, E. Mallinckrodt, A. Hughes et al., "Perception by the skin of electrically induced vibrations," Science 118(3062): 277-278, 1953). Mallinckrodt et al. discovered that if a voltage of 110 V is intermittently applied to a metal and a dry fingertip is dragged across the surface of the metal covered with an insulating layer, a rubbery feeling is produced.

The principle behind this physical phenomenon was analyzed by Mallinckrodt et al. as follows.

(1) The insulating layer of the dry skin acts as the dielectric material of a condenser with the metal as one capacitor, while the water (i.e. conducting material) contained in the finger constitutes the condenser and acts as another capacitor.

(2) When an alternating voltage is applied to the condenser, intermittent attractive force is produced between the skin and the metal.

(3) If the hand is moved while lightly pressing the surface, the friction between the skin and the plate surface periodically varies in magnitude, and the operator experiences the sensation of his or her finger being repeatedly attracted and released.

Although this phenomenon was discovered in 1953, practical use was not realized until 1970. In 1970, R. M. Strong developed a tactile display based on the above principle (see, for example, R. M. Strong and D. E. Troxel, "An electrotactile display," IEEE Transactions on Man-Machine Systems 11(1): 72-79, 1970). Strong proposed a display made up of an array of many pins covered with a dielectric material. If an intermittent voltage is applied to the pins and a finger is then moved over the pins, a tactile response is felt. More specifically, a distinct sensation of the finger being pulled is felt.

However, since the fusion of input and sensing technologies was insufficiently realized in proposed tactile displays at the time, the utility value of Strong's proposal was limited. Since the proposed configuration involved the use of a large number of pins, its use in a typical flat display, for example, was unfeasible.

In 1998, a similar tactile display was proposed by Tang and Beebe (see, for example, H. Tang and D. Beebe, "A microfabricated electrostatic haptic display for persons with visual impairments," IEEE Transactions on Rehabilitation Engineering 6(3): 241-248, 1998). As a result, a thin, durable display was realized by means of microfabrication technology using applied lithography. The underlying principle, however, was identical to Strong's.

Additionally, an electrovibrotactile display different from the above was proposed by Yamamoto, Nagasawa et al. in 2006 (see, for example, A. Yamamoto, S. Nagasawa et al., "Electrostatic tactile display with thin film slider and its application to tactile telepresentation systems," IEEE Transactions on Visualization and Computer Graphics 12(2): 168-177, 2006). The proposed display is configured as shown in FIG. 1, wherein a finger 31 moves a slider 20 placed upon a plate electrode 11 having the electrode pattern shown in the figure.

The slider 20 includes an aluminum layer 21 and an insulating layer 22. An electrode pattern is formed inside the plate electrode 11 such that + and − voltages are applied in alternation. A periodically varying voltage signal, like that shown by the applied voltage pattern 40 in FIG. 1, is applied to the electrodes within the plate electrode 11. As a result of this process, electrostatic force is produced between the conductive material of the slider 20 and the plate electrode 11. Note that in this configuration, the finger 31 only contacts the insulating layer 22, and thus a current is not produced. However, the electrode patterning in this configuration makes it difficult to implement in the displays of small devices.

SUMMARY OF THE INVENTION

As described above, several technologies for providing user interface feedback have been proposed, but a variety of problems still exist, such as unsuitability for compact devices, the discomfort of electric current flowing through a human body, or the limited number of patterns available for use as user interface feedback. In light of such problems, it is desirable to provide a user interface feedback apparatus, a user interface feedback method, and a program applicable to compact devices, for example, and whereby diverse user interface feedback is realized.

A user interface feedback apparatus in accordance with an embodiment of the present invention includes: an operable element having a two-layer structure made up of a conductor and an insulator; a sensor configured to detect, in the form of user contact information, at least a user contact position with respect to the insulator of the operable element; a processing unit configured to acquire the detected information from the sensor, and determine parameters for an electrical signal to be output to the conductor; and a tactile control module configured to control the frictional force between the insulator and the user by outputting to the conductor an electrical signal regulated by the parameters determined by the processing unit.

In a user interface feedback apparatus in accordance with another embodiment of the present invention, the processing unit determines voltage values and a frequency for an alternating voltage as the parameters of the electrical signal. The tactile control module then outputs to the conductor an electrical signal made up of an alternating voltage having the voltage values and frequency determined by the processing unit.

In a user interface feedback apparatus in accordance with another embodiment of the present invention, the sensor acquires and provides to the processing unit position information regarding the user contact site. The processing unit then determines electrical signal parameters in accordance with the position information regarding the user contact site acquired from the sensor.

A user interface feedback apparatus in accordance with another embodiment of the present invention further includes a display module. The processing unit is configured to determine parameters for the electrical signal according to the relationship between the contact position of the user with respect to the operable element obtained as detected information by the sensor, and an image displayed on the display module.

In a user interface feedback apparatus in accordance with another embodiment of the present invention, the sensor acquires and provides to the processing unit pressure information regarding the user contact site. The processing unit then determines the parameters of the electrical signal in accordance with the pressure information regarding the user contact site acquired from the sensor.

In a user interface feedback apparatus in accordance with another embodiment of the present invention, the sensor acquires and provides to the processing unit position information regarding the user contact site. The processing unit then determines the parameters of the electrical signal in accordance with motion information regarding the user contact site that is obtained on the basis of the position information regarding the user contact site acquired from the sensor.

In a user interface feedback apparatus in accordance with another embodiment of the present invention, the operable element is configured as a two-dimensional plane. The sensor detects the user contact position on the two-dimensional plane in the form of user contact information with respect to the operable element. The processing unit then determines parameters for an electrical signal to be output to the conductor in accordance with the user contact position on the two-dimensional plane.

In a user interface feedback apparatus in accordance with another embodiment of the present invention, the operable element is configured as a one-dimensional element. The sensor detects the user contact position on the one-dimensional line in the form of user contact information with respect to the operable element. The processing unit then determines parameters for an electrical signal to be output to the conductor in accordance with the user contact position on the one-dimensional line.

In a user interface feedback apparatus in accordance with another embodiment of the present invention, the sensor detects the user contact position according to electrostatic capacitive coupling.

In a user interface feedback apparatus in accordance with another embodiment of the present invention, the sensor is configured to include an optical sensor, an electrical sensor, a camera, or a pressure sensor.

A user interface feedback apparatus in accordance with another embodiment of the present invention is also earth-grounded in order to make the electrical potential of the user equal to the ground potential.

A user interface feedback apparatus in accordance with another embodiment of the present invention includes: an operable element having a many-layered structure made up of a display module, a transparent conductor, and a transparent insulator; a sensor configured to detect, in the form of user contact information, at least a user contact position with respect to the insulator of the operable element; a processing unit configured to acquire user contact position information in the form of the detected information from the sensor, and determine parameters for an electrical signal to be output to the conductor according to relationship between the user contact position and a display position with respect to the display module; and a tactile control module configured to control the frictional force between the insulator and the user by outputting to the conductor an electrical signal regulated by the parameters determined by the processing unit.

A user interface feedback method in accordance with another embodiment of the present invention is executed in an information processing apparatus, the method including the steps of: causing a sensor to detect, in the form of user contact information, at least a user contact position with respect to an insulator constituting part of an operable element having a two-layer structure made up of a conductor and an insulator; causing a processing unit to acquire the detected information from the sensor, and determine parameters for an electrical signal to be output to the conductor; and causing a tactile control module to control the frictional force between the insulator and the user by outputting to the conductor an electrical signal regulated by the parameters determined by the processing unit.

A program in accordance with another embodiment of the present invention causes user interface feedback processing to be executed in an information processing apparatus, the program including the steps of: causing a sensor to detect, in the form of user contact information, at least a user contact position with respect to an insulator constituting part of an operable element having a two-layer structure made up of a conductor and an insulator; causing a processing unit to acquire the detected information from the sensor, and determine parameters for an electrical signal to be output to the conductor; and causing a tactile control module to control the frictional force between the insulator and the user by outputting to the conductor an electrical signal regulated by the parameters determined by the processing unit.

The program in accordance with an embodiment of the present invention is providable in computer-readable format via a storage medium or communication medium to a general-purpose system capable of executing various program code, for example. By providing such a program in a computer-readable format, processing in accordance with the program is realized on the computer system.

Further features and advantages of the present invention will become apparent upon reading of the following detailed description of exemplary embodiments in conjunction with the attached drawings. In the present specification, a system refers to the logical assembly of a plurality of apparatus, and is not limited to respective apparatus being housed in a single physical unit.

According to an embodiment of the present invention, an apparatus that provides user interface feedback to a user is realized. An operable element is configured having a two-layered structure of a conductor and an insulator. At least a user contact position with respect to the insulator of the operable element is detected by a sensor, in the form of user contact information. On the basis of the information detected by the sensor, parameters for an electrical signal to be output to the conductor are determined. More specifically, voltage values and a frequency for an alternating voltage are determined. The electrical signal thus determined is then output to the conductor. As a result of such a configuration, different frictional forces are produced between the user's fingertip and the insulator by means of a variety of electrical signals. In so doing, the user is able to experience a variety of different types of user interface feedback.

BRIEF DESCRIPTION OF THE DRAWINGS

FIG. 12 illustrates an exemplary hardware configuration of a user interface feedback apparatus in accordance with an embodiment of the present invention.

DESCRIPTION OF THE PREFERRED EMBODIMENTS

Figure 1:
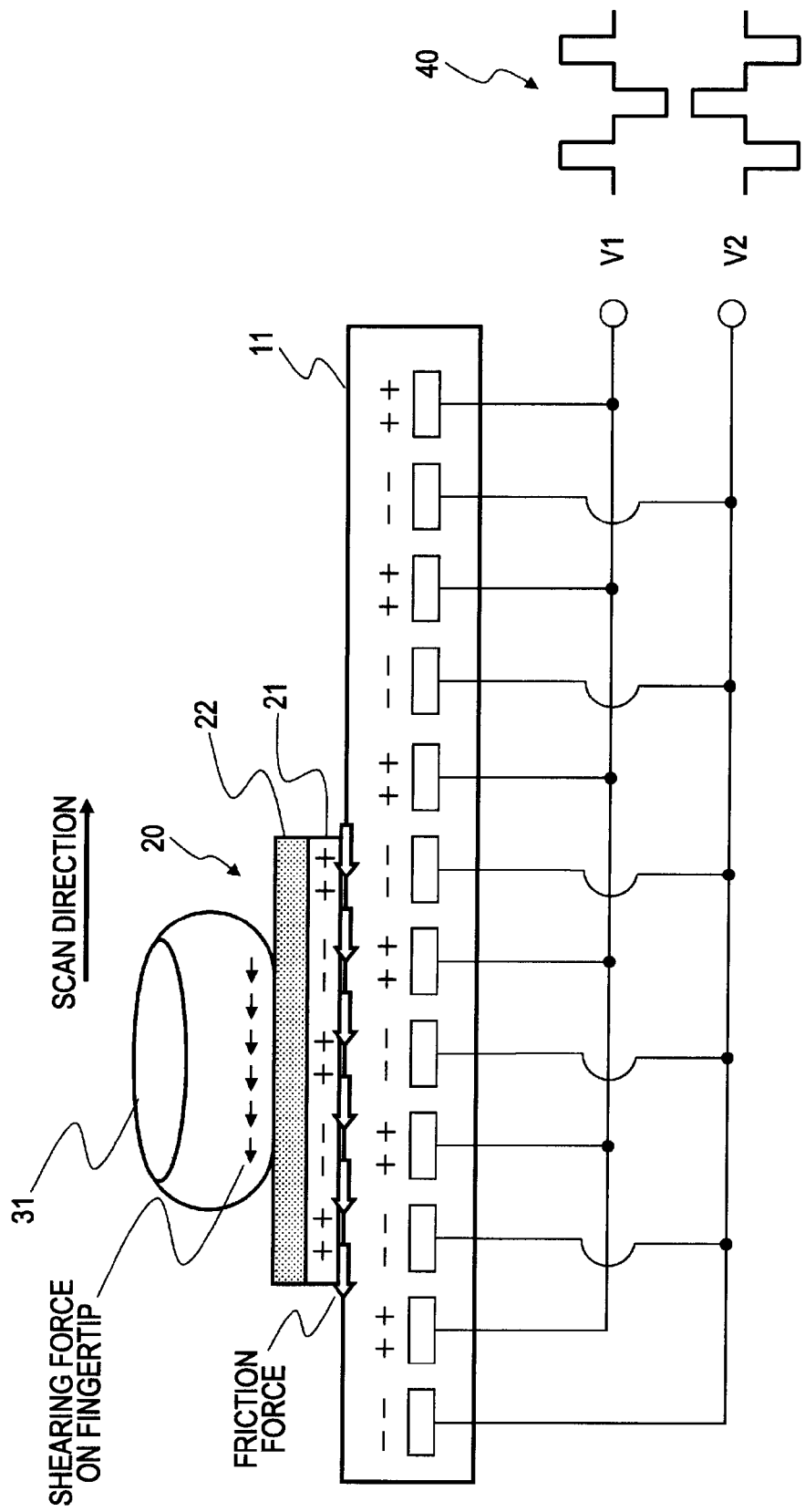
FIG. 1 illustrates an exemplary configuration of a tactile display having an electrode pattern.

Hereinafter, a user interface feedback apparatus, a user interface feedback method, and a program in accordance with embodiments of the present invention will be described in detail and with reference to the accompanying drawings. The description will proceed as follows.

(1) Exemplary configuration of user interface feedback apparatus and explanation of principles
(2) Specific examples of user interface feedback apparatus
(1) Exemplary Configuration of User Interface Feedback Apparatus and Explanation of Principles First, an exemplary configuration of a user interface feedback apparatus, and the operating principles thereof, will be described. A user interface feedback apparatus in accordance with an embodiment of the present invention provides user interface feedback to users, and is applicable to a variety of information processing equipment. Such apparatus are referred to as tactile interfaces and haptic apparatus, for example. A user interface feedback apparatus in accordance with an embodiment of the present invention may, for example, be integrated with a liquid crystal display (LCD) apparatus as a haptic display, or used as a touch pad or large screen display apparatus.

For example, if an embodiment of the present invention is integrated with an LCD apparatus, the operable element may be displayed on the LCD as images or icons of elements such as switches, buttons, sliders, and dials. When the user performs an operation by touching such display images or icons with his or her finger, a physical sensation, such as that of friction, is produced in response to the user operation, thereby providing user interface feedback.

A user interface feedback apparatus in accordance with an embodiment of the present invention will now be described with reference to FIG. 2. The user interface feedback apparatus 100 shown in FIG. 2 includes an operable element 110. The user's finger 150 performs an operation with respect to the operable element 110.

The operable element 110 may be configured to be a user interface (UI) realized by an LCD apparatus. The user's finger 150 thus performs operations with respect to various switches, buttons, sliders, dials, or other elements displayed on the operable element 110.

Figure 3:
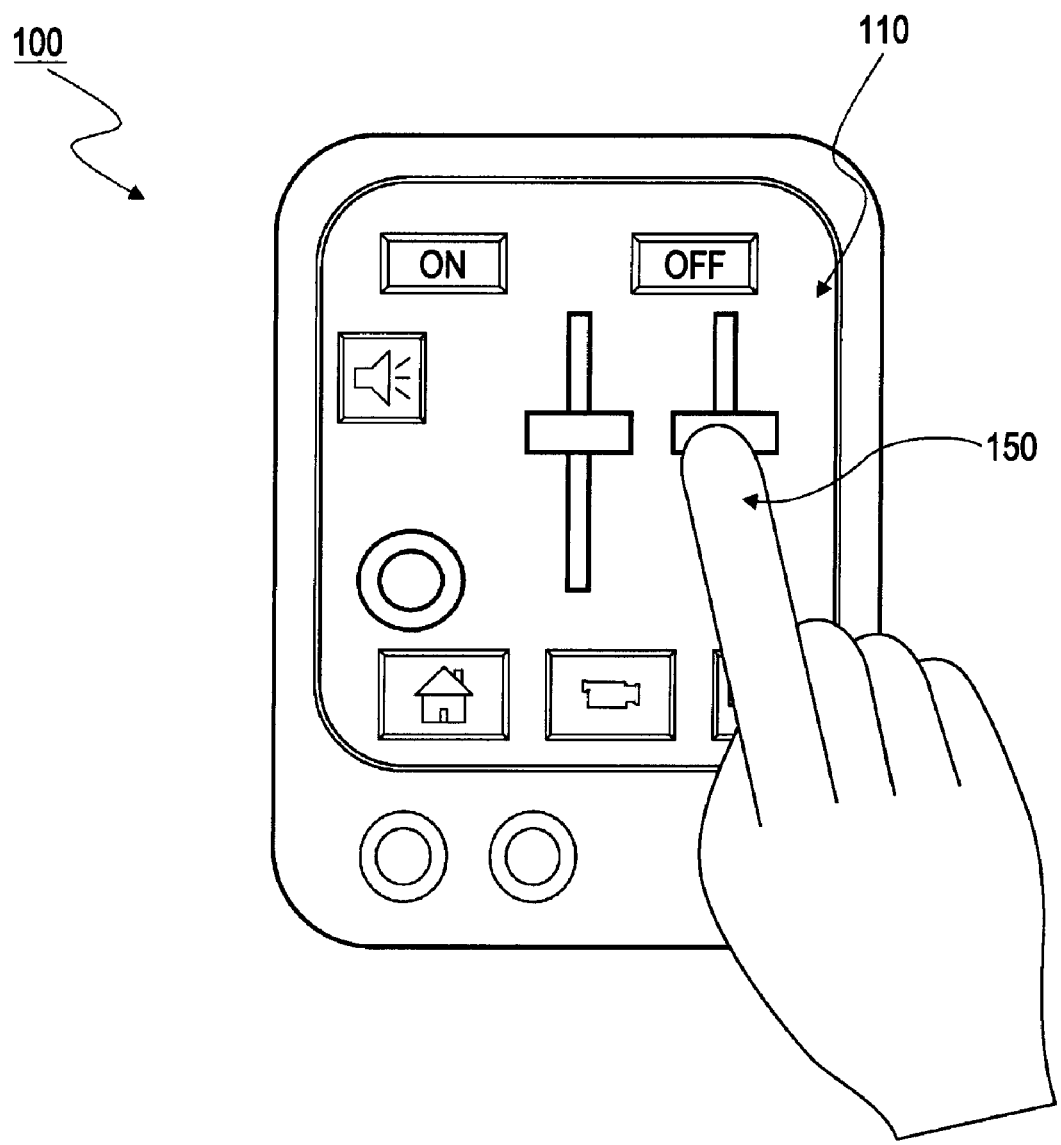
FIG. 3 illustrates an exemplary configuration of a user interface feedback apparatus in accordance with an embodiment of the present invention, in the case where the operable element is configured as a user interface (UI) realized by a liquid crystal display (LCD) apparatus.

An example of the operable element 110 is shown in FIG. 3, wherein the operable element 110 is configured to be a user interface (UI) realized by an LCD apparatus. On an operable element 110 like that shown by way of example in FIG. 3, icons (i.e., images) of various elements such as switches, buttons, sliders and dials are displayed. The user's finger 150 performs operations with respect to these icons (i.e., images). The user interface feedback apparatus 100 in accordance with the present embodiment then produces user interface feedback, such as friction, for example, in response to the user operations.

It should be appreciated that the operable element is not limited to being a display, and may also be configured as a simple surface. In the example shown in FIG. 2, the operable element 110 and a display 125 are shown separately as individual units. The operable element and the display may thus be configured separately. Alternatively, the operable element 110 and the display 125 may be combined in a configuration like that shown in FIG. 3.

Figure 2:
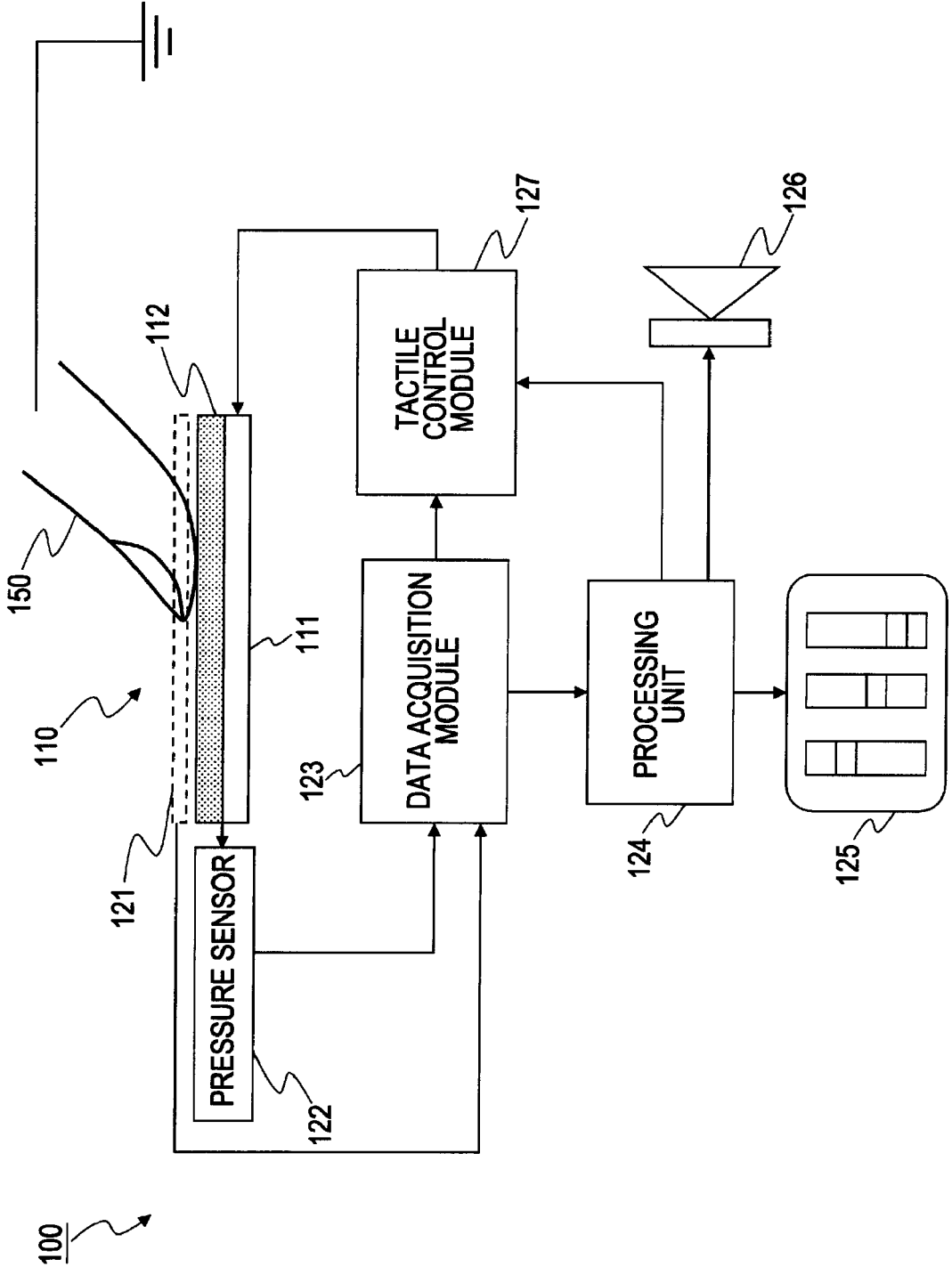
FIG. 2 illustrates the configuration of a user interface feedback apparatus in accordance with an embodiment of the present invention.

As shown in FIG. 2, the operable element 110 includes an electrode sheet (i.e., a conductor) 111 and an insulator 112. The operable element 110 is configured such that the user's finger 150 does not touch the electrode sheet 111, but instead only contacts the insulator 112.

The operable element 110 is also provided with a position sensor 121 that detects the position of the user's finger 150, as well as a pressure sensor 122 that measures values such as the pressure and inclination due to the user's finger 150. The detected data from these sensors is input into a data acquisition module 123.

An example of the position sensor 121 will now be described with reference to FIG. 4, wherein the sensor is configured by way of example as a sensor using electrostatic capacitive coupling. In-phase, equipotential AC current flows are applied from the four corners of the operable element 110, and from the respective current values, X and Y coordinates expressing the position of the finger are computed. More specifically, the position of the finger is computed according to $$X = k1 + k2((i2+i3)/(i1+i2+i3+i4))$$

$$Y = k1 + k2((i1+i2)/(i1+i2+i3+i4))$$

wherein k1 and k2 express offset and scale factors, respectively.

Figure 4:
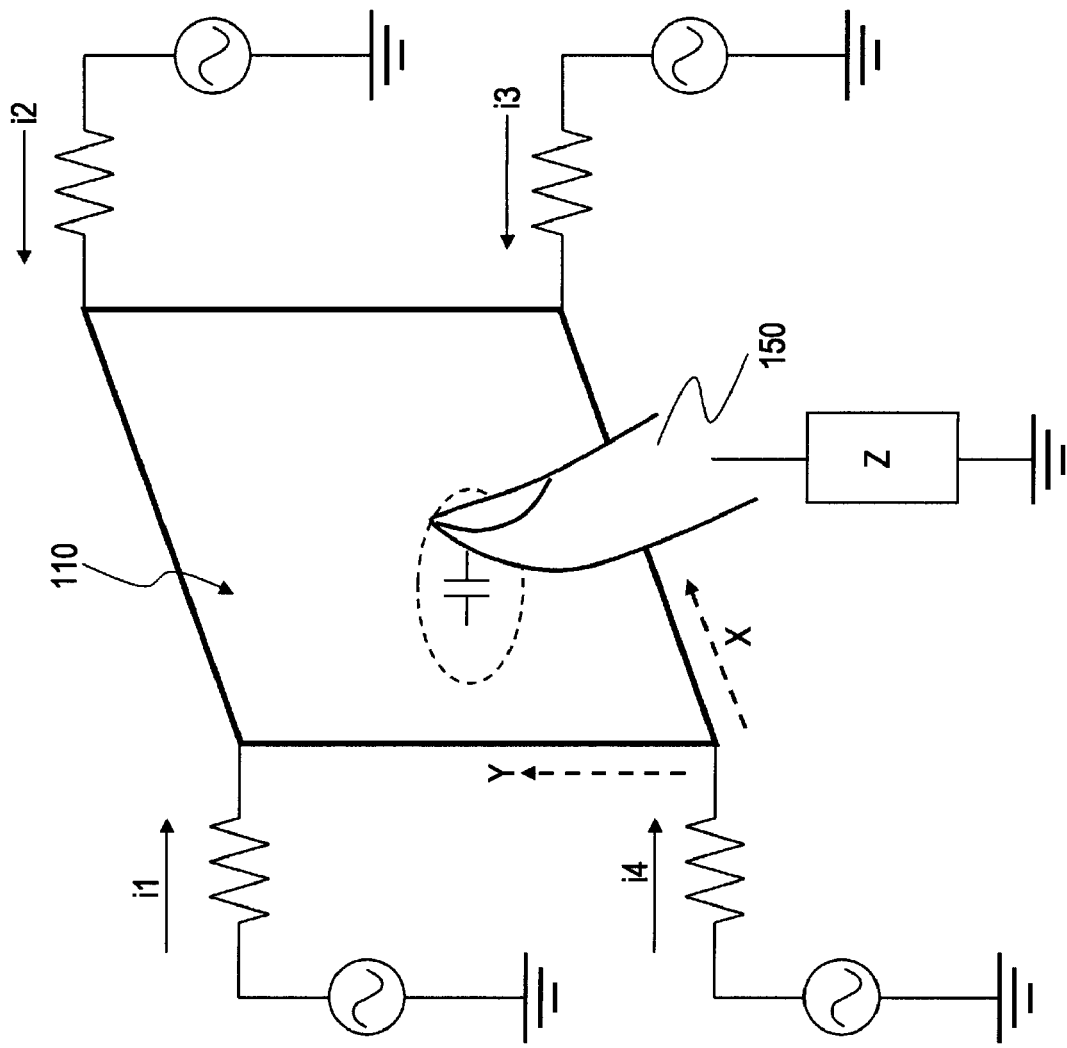
FIG. 4 illustrates an exemplary position sensor, herein configured by way of example as a sensor using electrostatic capacitive coupling.

However, it should be appreciated that the position sensor 121 is configurable in ways other than that shown in FIG. 4, and may be realized by means of existing sensor technology such that the finger's position and movement over a two-dimensional plane are detected. For example, the position sensor 121 may be configured as an optical, infrared, or laser sensor that optically detects the position of the user's finger, or as an electrical or pressure sensor that detects the finger's contact position. The pressure sensor 122 is for acquiring information regarding user operations performed with respect to the switches or other elements displayed on the operable element 110. For example, the pressure sensor 122 may acquire user operation information regarding push operations.

The detected data from the above sensors is input into a processing unit 124 via the data acquisition module 123. The processing unit 124 may be realized by means of a microprocessor or a personal computer, for example.

On the basis of the sensor information, the processing unit 124 analyzes the user operation performed with respect to the operable element 110, and conducts processing in accordance with that operation. Additionally, the processing unit 124 may also conduct processing to update the information being displayed on the display 125, or conduct audio output processing in accordance with user operations performed with respect to an audio output unit (i.e., one or more speakers) 126.

The processing unit 124 also outputs commands to a tactile control module 127. Such commands are for controlling the electrical signal output to the electrode sheet 111 of the operable element 110 by the tactile control module 127. For example, values such as the position and pressure of the user's finger may be detected by the sensors, whereupon the processing unit 124 determines voltages and frequencies in accordance with the information detected by the sensors. The processing unit 124 then outputs a command specifying the above parameters to the tactile control module 127. Herein, the processing unit 124 also conducts processing to acquire the position information detected by the sensors, determine the motion of the user's finger 150 (i.e., motion information) on the basis of the time-rate-of-change of the position information, and determine a voltage and frequency on the basis of the motion information results.

In response to a command input from the processing unit 124, the tactile control module 127 outputs an electrical signal to the electrode sheet 111 of the operable element 110.

The electrical signal output by the tactile control module 127 is time-variant, and may be an alternating voltage signal, for example. If the user then drags his or her finger 150 over the insulator 112 of the operable element 110 while the electrical signal is being fed to the electrode sheet 111, then friction corresponding to the electrical signal will be produced, and the user will experience user interface feedback.

Figure 5:
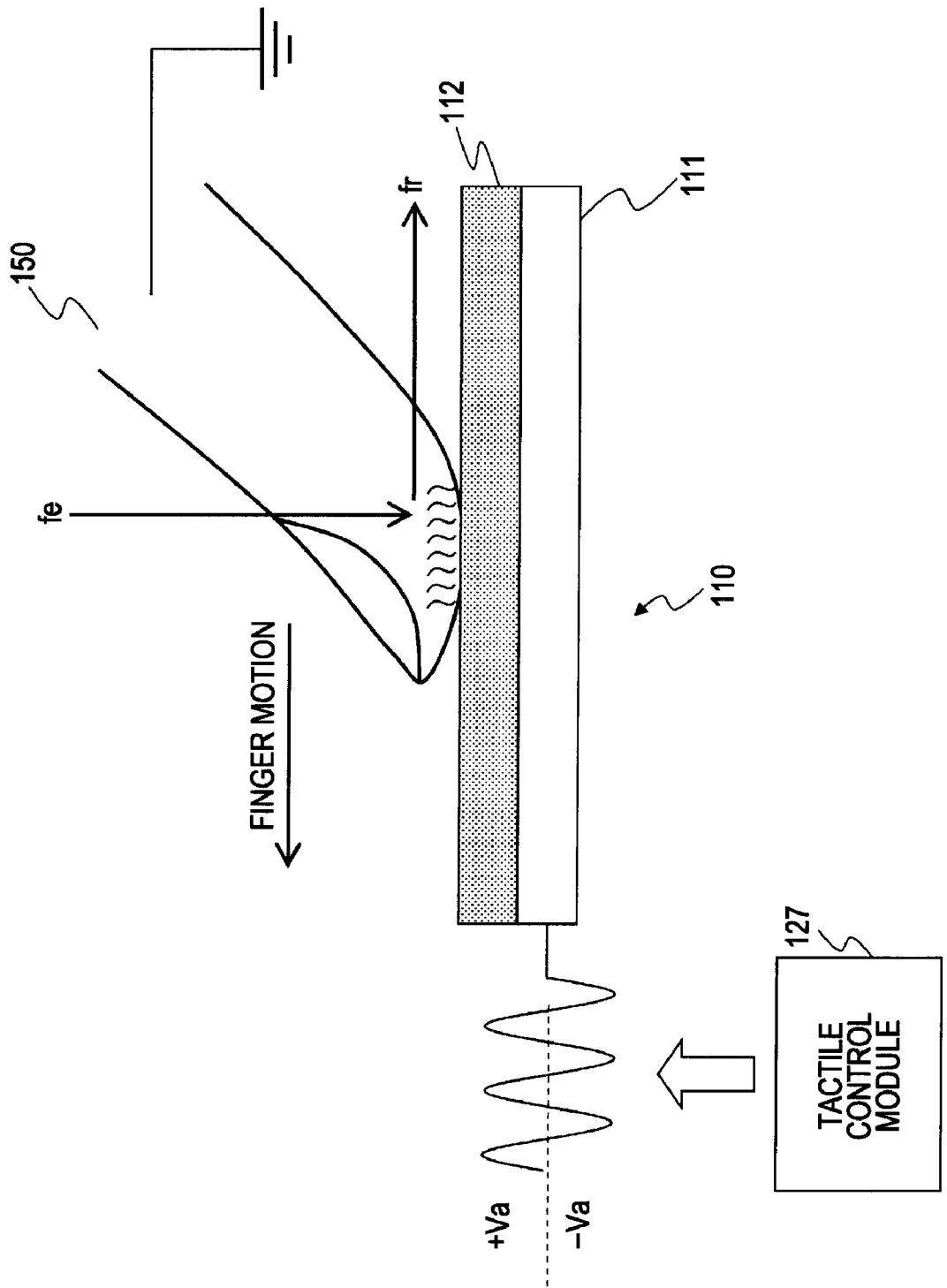
FIG. 5 is a diagram for explaining the principle for producing friction in a user interface feedback apparatus in accordance with an embodiment of the present invention.

The principles of this feedback will now be described with reference to FIG. 5. As shown in FIG. 5, the tactile control module 127 inputs into the electrode sheet 111 of the operable element 110 a time-variant alternating voltage signal varying between +Va and −Va, for example.

Assume that the user's finger 150 moves from right to left as shown in FIG. 5 over the insulator 112 of the operable element 110. In response to such motion, frictional force fr is produced between the user's finger 150 and the surface of the insulator 112. By applying a periodically varying voltage signal to the electrode sheet 111 of the operable element 110 at this point, an attractive force fe is produced that draws the user's finger 150 towards the electrode sheet 111. The principle behind the production of this attractive force is identical to that described earlier with reference to FIG. 1.

Herein, in order to sufficiently utilize the effect of varying the magnitude of the friction on the basis of an electrical signal, it is preferable to prevent charge from accumulating in the user him- or herself, such as by grounding the user to set his or her potential to the ground potential. To set a person's body to the ground potential, it is preferable to connect an earth cable to the user's skin, for example. Alternatively, the user's electrical potential may be kept at the ground potential by having the user's accumulated charge discharged via the floor he or she is standing on. Alternatively, the device provided with the operable element may be designed to include an earthing part that the user him- or herself touches. The user's accumulated charge may also be discharged via other protective accessories or clothing.

In keeping with the principle described earlier with reference to FIG. 1, an attractive force fe is produced that draws the user's finger 150 to the electrode sheet 111, thereby increasing the frictional force fr. The magnitude of the attractive force fe varies according to magnitude and period of the voltage applied to the electrode sheet 111 of the operable element 110 by the tactile control module 127. As a result, the magnitude of the frictional force fr also varies according to the magnitude and period of the applied voltage. The user thus experiences a varying frictional force from his or her fingertip. More specifically, the user also experiences vibration due to the varying frictional force. This tactile sensation is perceived by the user as user interface feedback.

It is possible to modify the user's tactile sensation by modifying the magnitude and period of the voltage applied to the electrode sheet 111 of the operable element 110 by the tactile control module 127. The magnitude and period of the voltage is determined by the commands output to the tactile control module 127 from the processing unit 124.

As described with reference to FIG. 2, the processing unit 124 acquires sensor information regarding factors such as the position, motion, and pressure of the user's finger 150 from the position sensor 121 and the pressure sensor 122. The processing unit 124 then sets commands in accordance with the above sensor information.

For example, if it is detected that a slider displayed on the operable element is being operated, then the processing unit 124 outputs a command to the tactile control module 127 specifying the output of an electrical signal having a voltage magnitude and period set such that a frictional sensation corresponding to the slider's motion is produced. In response to this command, the tactile control module 127 generates an electrical signal having the set voltage magnitude and period, and then applies the generated electrical signal to the electrode sheet 111 of the operable element 110.

If it is detected by sensor information that the user's finger 150 is operating a dial displayed on the operable element 110, then the processing unit 124 outputs a command to the tactile control module 127 specifying the output of an electrical signal having a voltage magnitude and period set such that frictional force corresponding to the finger's motion is produced. In response to this command, the tactile control module 127 generates an electrical signal having the set voltage magnitude and period, and then applies the generated electrical signal to the electrode sheet 111 of the operable element 110.

If, for example, the user's finger 150 is in a region of the operable element 110 where nothing is being displayed, then the processing unit 124 outputs a command to the tactile control module 127 for stopping the application of voltage. In response to this command, the tactile control module 127 terminates output of the electrical signal to the electrode sheet 111 of the operable element 110. By means of this process, the user experiences frictional force and vibration as user interface feedback when moving his or her finger in a region where a switch, slider, or other element is displayed on the operable element 110, but the user does not experience any particular tactile sensation when his or her finger is touching a portion where nothing is displayed.

In this way, in an embodiment of the present invention as configured above, the commands from the processing unit 124 are modified according to factors such as the position, motion, and applied pressure of the user's fingers, with the tactile control module 127 subsequently controlling the electrical signal to be applied to the electrode sheet 111 of the operable element 110. As a result, it becomes possible to vary the frictional force in accordance with factors such as the position, motion, and applied pressure of the user's finger, thereby enabling the user to experience diverse user interface feedback.

Furthermore, in an embodiment of the present invention as configured above, the operable element 110 may have a two-layer structure made up of an electrode sheet 111 and an insulator 112, and may be configured without disposing a large number of electrodes as described earlier with reference to FIG. 1. Consequently, it is possible to miniaturize the above configuration and significantly reduce costs. Moreover, the operable element may also be configured having a flexible structure, and may be utilized in a variety of devices.

In an embodiment of the present invention as configured above, it is possible to independently modify the voltage and frequency to be applied to the electrode sheet 111 of the operable element 110, thereby enabling the user to experience a variety of user interface feedback variations. It is thus possible to appropriately modify the voltage and frequency in accordance with the conditions whereby the user performs input operations with respect to the operable element 110, and in accordance with the information displayed on the operable element.

However, it should be appreciated that the configuration described with reference to FIGS. 2 to 5 is merely one embodiment of the present invention, and that other configurations are also possible wherein various sensors are used to acquire user information or similar data other than that of the above configuration. For example, another embodiment may be configured to detect the position and motion of the user's finger by means of components such as an optical sensor, a laser sensor, or a camera. Furthermore, the operable element is modifiable for use in a variety of configurations, such as in the flexible structure or the display described above.

(2) Specific Examples of User Interface Feedback Apparatus

Figure 6:
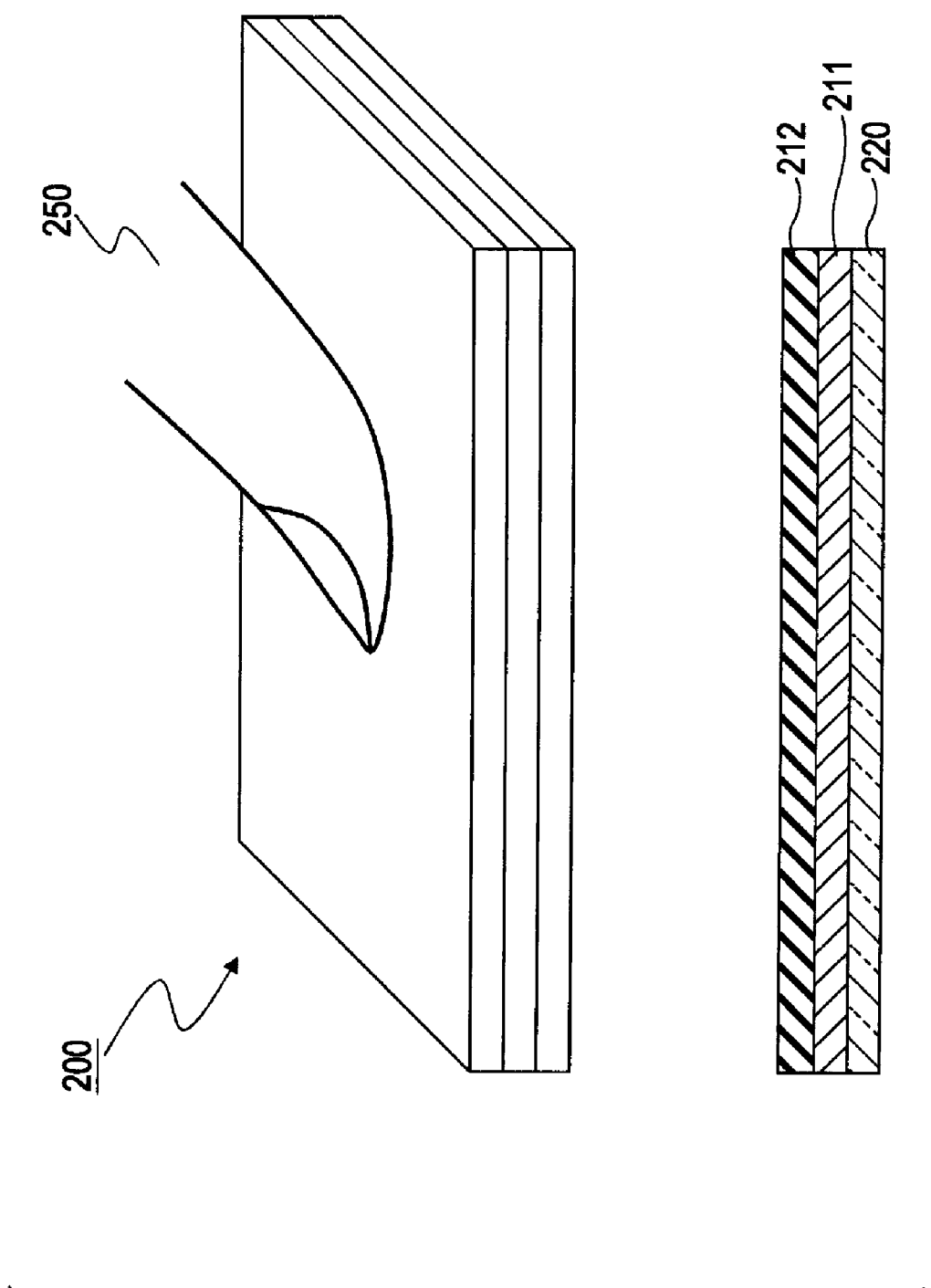
FIG. 6 illustrates an exemplary configuration of a user interface feedback apparatus in accordance with an embodiment of the present invention, herein configured by way of example as a two-dimensional (2D) user interface feedback apparatus.

Hereinafter, several specific examples of the user interface feedback apparatus of the present invention will be described with reference to FIGS. 6 to 10B. The following two exemplary configurations will be described in sequence:

(2-1) Two-dimensional (2D) user interface feedback apparatus (2-2) One-dimensional (1D) user interface feedback apparatus (2-1) Two-Dimensional (2D) User Interface Feedback Apparatus First, a two-dimensional (2D) user interface feedback apparatus will be described with reference to FIG. 6. The two-dimensional user interface feedback apparatus is principally similar in configuration to that described with reference to FIGS. 2 to 5, wherein the operable element has been integrated with an LCD or similar display, for example. FIG. 6 illustrates the configuration of the operable element 200 only. The operable element 200 has a laminar structure wherein a transparent electrode sheet 211 and a transparent insulator 212 have been stacked on top of a transparent sheet 220 made of a material such as glass or plastic. The bottom transparent sheet 220 is a component of an LCD, for example.

Such a configuration is realizable simply by forming the transparent electrode sheet 211 and transparent insulator 212 on top of an existing display. The transparent electrode sheet 211 and the transparent insulator 212 in the configuration shown in FIG. 6 correspond to the electrode sheet 111 and the insulator 112 in the configuration shown in FIG. 2. Although FIG. 6 shows only the operable element 200, processing modules similar to those of FIG. 2 are connected to the operable element 200.

Factors such as the position and pressure of the user's finger 250 are detected by sensors, a voltage and frequency are determined in accordance with the information detected by the sensors, and an electrical signal is fed to the transparent electrode sheet 211. Note that at this point, processing may also be conducted to determine the motion of the user's finger 250 (i.e., motion information) from changes in the position information detected by the sensors, and then determine a voltage and frequency in accordance with the motion information results. When the user's finger 250 is moved over the transparent insulator 212, friction is felt whose magnitude varies according to the electrical signal fed into the transparent electrode sheet 211. The user experiences this friction as user interface feedback in response to the user's operation, such as the operation of a switch or slider displayed on the operable element 200 by the user's finger 250.

As described earlier, the voltage and frequency of the electrical signal output to the transparent electrode sheet 211 may be set to arbitrary values in accordance with factors such as the position, motion, and pressure of the user's finger 250. It is possible to execute processing such that, if the user's fingertip is touching the position of an element such as a switch or slider displayed as an image or icon on the operable element 200, then an electrical signal having predetermined voltage and frequency values set in accordance with particular images or icons is input. In contrast, if the user's fingertip is not touching the position of an image or icon representing an element such as a switch or slider, then the electrical signal is terminated. By means of such processing, the user performing operations with respect to the operable element 200 made up of images/icons is able to experience user interface feedback similar to that experienced when operating the mechanical operable element of an actual switch or slider.

Figure 7:
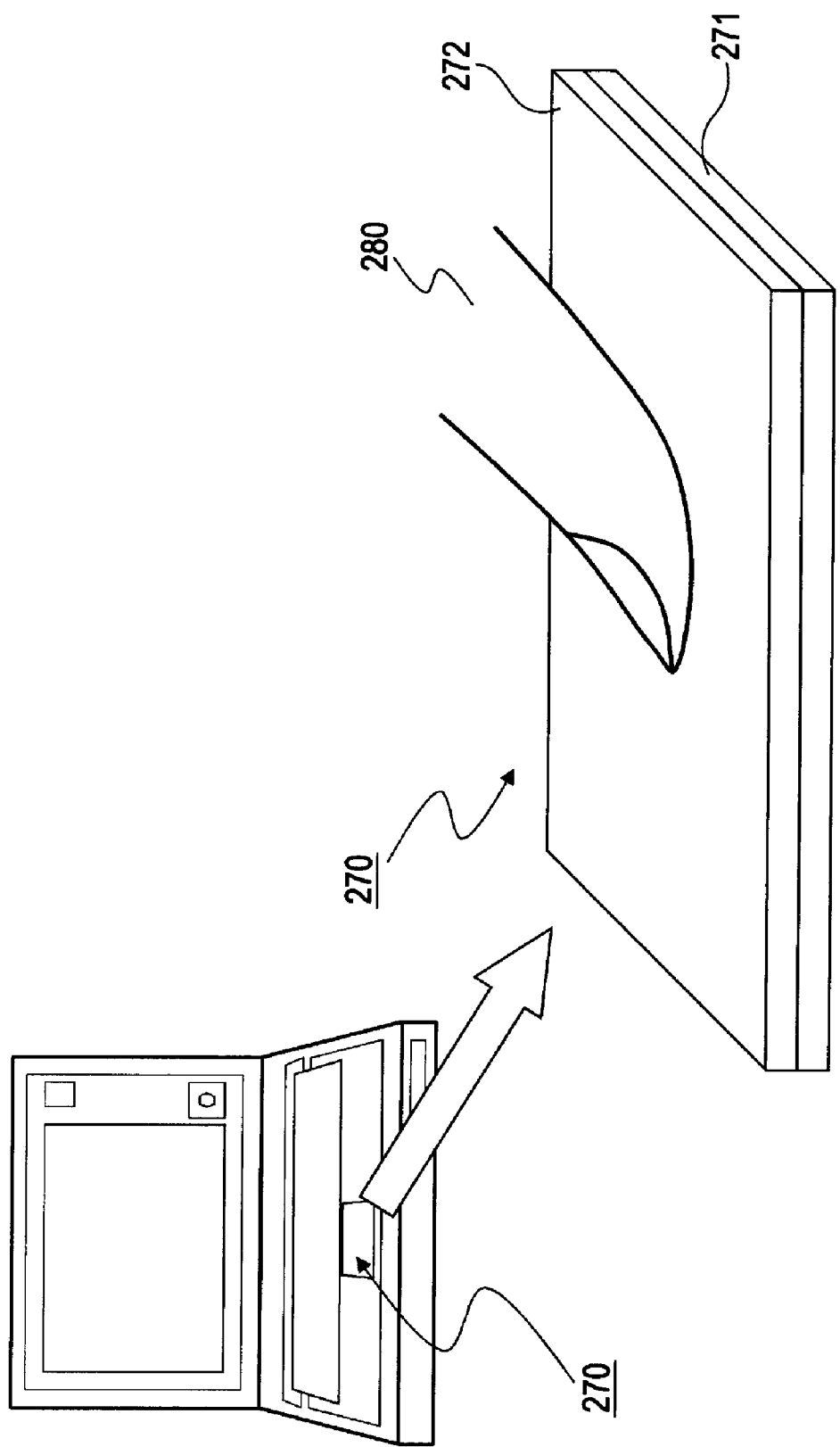
FIG. 7 illustrates an exemplary configuration of a user interface feedback apparatus in accordance with an embodiment of the present invention, herein configured by way of example as a two-dimensional (2D) user interface feedback apparatus for use as a touch pad in a device such as a PC.

The configuration illustrated in FIG. 7 will now be described as an exemplary embodiment of a two-dimensional (2D) user interface feedback apparatus. FIG. 7 illustrates a two-dimensional (2D) user interface feedback apparatus configured for use as a touch pad in a device such as a PC. FIG. 7 illustrates only the operable element 270. The operable element 270 is configured as the touch pad of a PC. In this configuration, the operable element 270 does not include display functions.

The operable element 270 has a structure made up of an electrode sheet 271 and an insulator 272. The electrode sheet 271 and the insulator 272 in the configuration shown in FIG. 7 correspond to the electrode sheet 111 and the insulator 112 in the configuration shown in FIG. 2. Although FIG. 7 shows only the operable element 270, processing modules similar to those of FIG. 2 are connected to the operable element 280. Such processing modules may be realized by the PC, for example.

Factors such as the position and pressure of the user's finger 280 are detected by sensors. A voltage and frequency are then determined in accordance with the information detected by the sensors, or in accordance with motion information derived from the information detected by the sensors. An electrical signal is then fed to the electrode sheet 271. When the user's finger 280 is moved over the insulator 272, friction is felt whose magnitude varies according to the electrical signal fed into the electrode sheet 271. The user experiences this friction as user interface feedback in response to the user's operation of the operable element 270 by the user's finger 280, for example.

Figure 8:
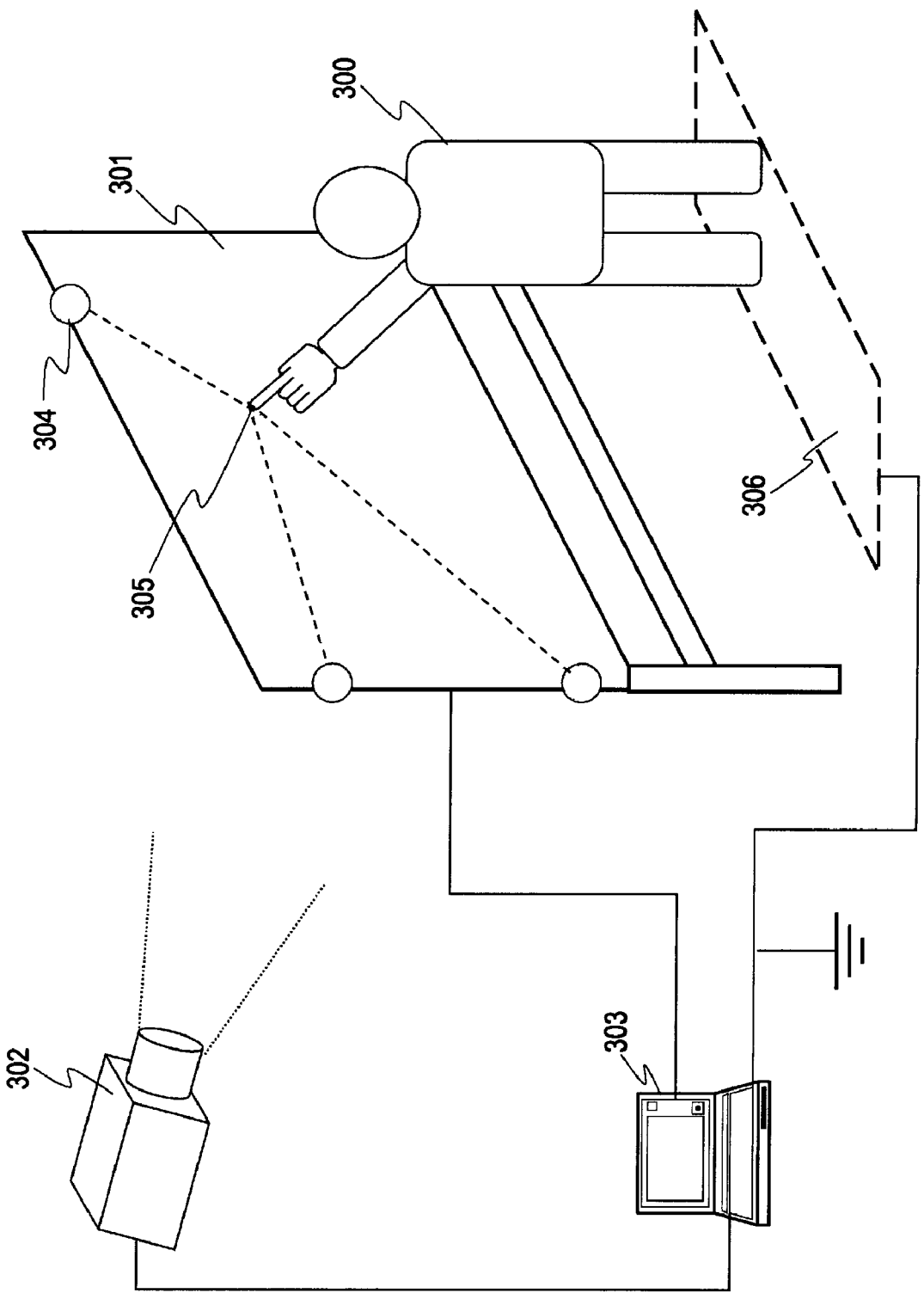
FIG. 8 illustrates an exemplary configuration of a user interface feedback apparatus in accordance with an embodiment of the present invention, herein configured by way of example such that an image is displayed on a screen by a projector, and wherein the user performs interface operations with respect to the image displayed on the screen.

The configuration illustrated in FIG. 8 will now be described as another exemplary embodiment of a two-dimensional (2D) user interface feedback apparatus. FIG. 8 illustrates a configuration wherein an image is displayed on a screen 301 by a projector 302, and wherein a user 300 performs interface operations with respect to the image displayed on the screen 301.

In this case, the screen 201 functions as the operable element. In other words, the screen 301 has a laminar structure as shown in FIG. 9, wherein a transparent electrode sheet 311 and a transparent insulator 312 have been stacked on top of a transparent sheet 320 made of a material such as glass or plastic.

Figure 9:
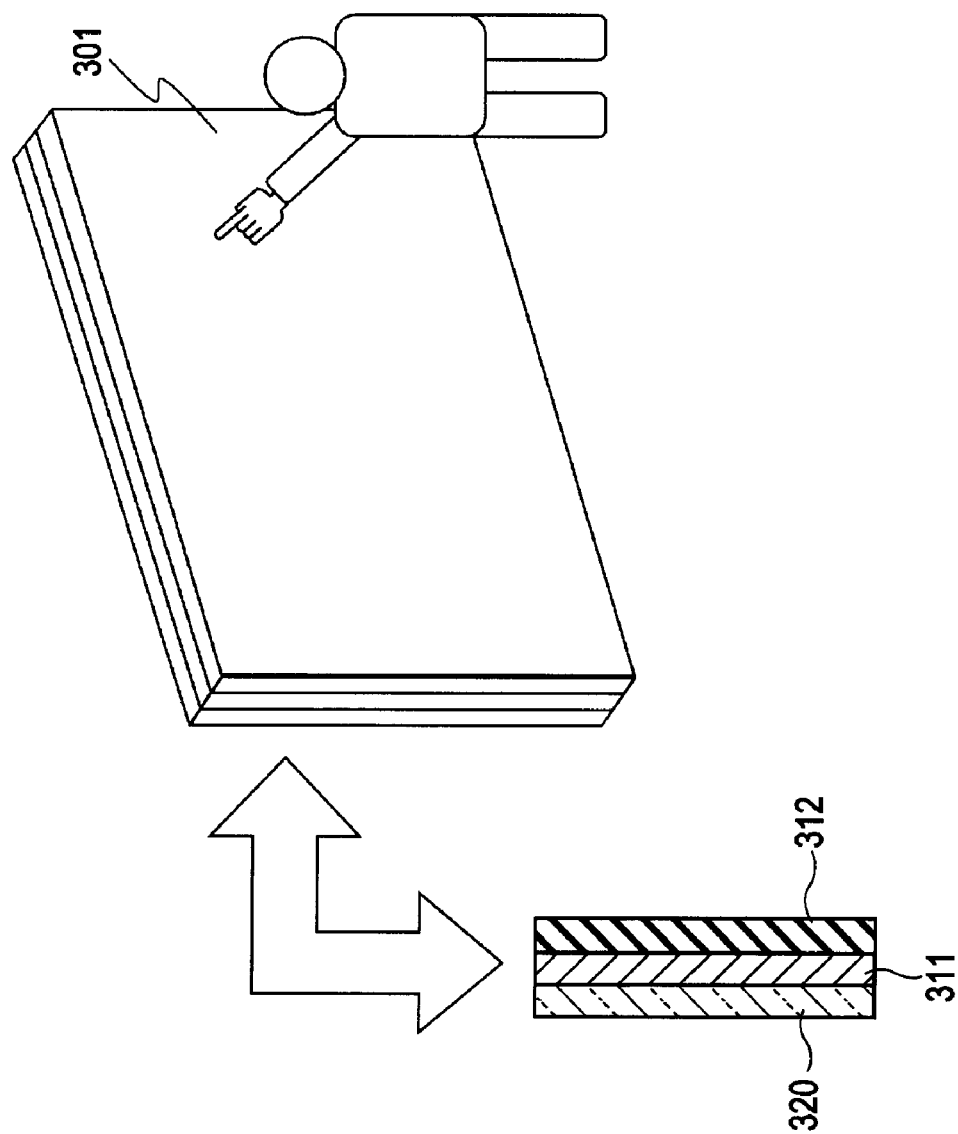
FIG. 9 illustrates the configuration of the screen in the embodiment shown in FIG. 8.

The transparent electrode sheet 311 and the transparent insulator 312 in the configuration shown in FIG. 9 correspond to the electrode sheet 111 and the insulator 112 in the configuration shown in FIG. 2. The information processing apparatus (PC) 303 connected to the screen 301 acting as the operable element and shown in FIG. 8 includes processing modules similar to those shown in FIG. 2.

Factors such as the position and pressure of the finger of the user 300 are detected by sensors 304, with the information detected by the sensors being acquired by the information processing apparatus (PC) 303. The information processing apparatus (PC) 303 determines a voltage and frequency in accordance with the acquired sensor information, and then outputs an electrical signal to the transparent electrode sheet 311 of the screen 301. For example, the information processing apparatus (PC) 303 may derive the motion of the user's finger from the information detected by the sensors, determine a voltage and frequency in accordance with the results, and then output the resulting electrical signal to the transparent electrode sheet 311 of the screen 301.

When the finger 305 of the user 300 is moved over the transparent insulator 312, friction is felt whose magnitude varies according to the electrical signal fed into the transparent electrode sheet 311. For example, when the user 300 uses his or her finger 305 to perform operations with respect to various objects displayed on the screen 301, the user may experience user interface feedback uniquely corresponding to particular displayed objects in the form of unique frictions set by the electrical signals.

Similarly to the configuration described earlier, the voltage and frequency of the electrical signal output from the information processing apparatus (PC) 303 to the transparent electrode sheet 311 of the screen 301 may be set to arbitrary values in accordance with factors such as the position, motion, and pressure of the finger of the user 300. Thus, if the user 300 is touching the position of one of various object images displayed on the screen 301, an electrical signal having predetermined voltage and frequency values set for that object can be input. In so doing, the user can experience a different frictional force for each displayed object.

It is also possible to execute processing to terminate the electrical signal when the user is not touching the position of a displayed object. By means of such processing, various object images can be displayed on the screen 301, and user interface feedback corresponding to each object can be provided to the user.

As described earlier, it is preferable to configure the apparatus so as to prevent charge accumulation with respect to the user 300. In the present embodiment, the user may be grounded by the floor 306.

(2-2) One-Dimensional (1D) User Interface Feedback Apparatus

Figure 10A:
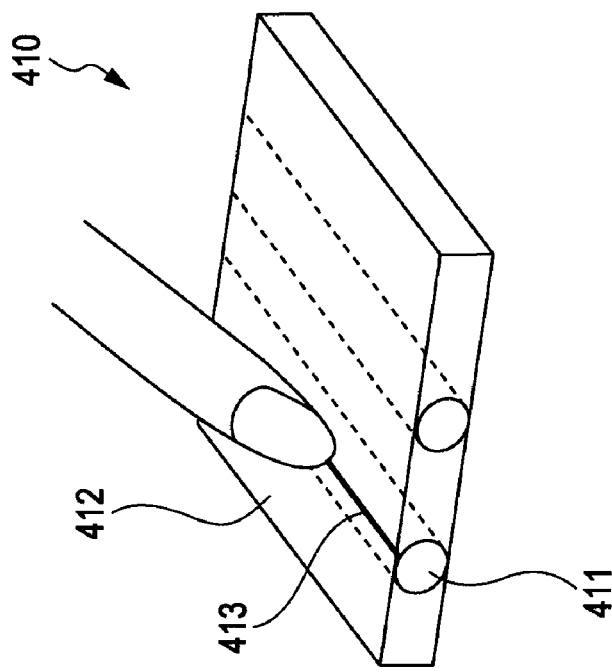
FIG. 10A illustrates an exemplary configuration of a user interface feedback apparatus in accordance with an embodiment of the present invention, herein configured by way of example as a one-dimensional (1D) user interface feedback apparatus.
Figure 10B:
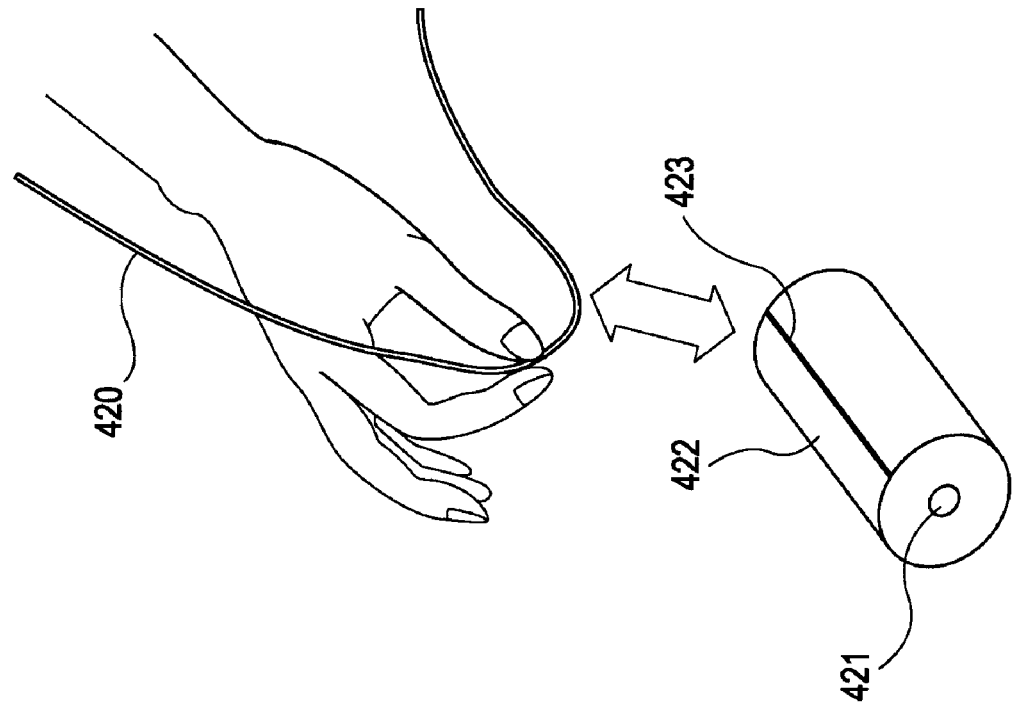
FIG. 10B illustrates an exemplary configuration of a user interface feedback apparatus in accordance with an embodiment of the present invention, herein configured by way of example as a one-dimensional (1D) user interface feedback apparatus.

Next, a one-dimensional (1D) user interface feedback apparatus will be described with reference to FIGS. 10A and 10B. A one-dimensional user interface feedback apparatus includes an operable element running along a single line. FIG. 10A illustrates an exemplary configuration wherein a linear operable element is disposed on a base plate. FIG. 10B illustrates an exemplary configuration of a string-shaped operable element. The above exemplary configurations will now be described in sequence.

(a) Exemplary Configuration of a Linear Operable Element Disposed on a Base Plate The operable element 410 shown in FIG. 10A includes: a conducting wire 411 made of a conducting material; an insulating plate 412 made of an insulating material; and a sensor 413.

An external electrical signal is applied to the conducting wire 411. If the user then drags his or her finger over the insulating plate 412 while the external electrical signal is being applied to the conducting wire 411, a predetermined friction is produced.

The conducting wire 411 and the insulating plate 412 in the configuration shown in FIG. 10A correspond to the electrode sheet 111 and the insulator 112 in the configuration shown in FIG. 2. Although only the operable element 410 is shown in FIG. 10A, processing modules similar to those shown in FIG. 2 are connected to the operable element 410. Such processing modules are realizable by means of a PC, for example.

Factors such as the position and pressure of the user's finger are detected by the sensor 413, with the information detected by the sensor being acquired by an information processing apparatus (PC), for example. The information processing apparatus determines a voltage and frequency in accordance with the acquired sensor information, and then outputs an electrical signal to the conducting wire 411. For example, the information processing apparatus may derive the motion of the user's finger from the information detected by the sensor, determine a voltage and frequency in accordance with the results, and then output the resulting electrical signal to the conducting wire 411.

When the user's finger is moved over the conducting wire 411 while touching the insulating plate 412, friction is felt whose magnitude varies according to the electrical signal fed to the conducting wire 411. The user thus experiences unique user interface feedback in the form of unique frictions set by the electrical signals.

Similarly to the configuration described earlier, the voltage and frequency of the electrical signal output from the information processing apparatus (PC) or similar device to the conducting wire 411 may be set to arbitrary values in accordance with factors such as the position, motion, and pressure of the user's finger. For example, it is possible to configure an embodiment such that signals with different set values for voltage and frequency are respectively output to a plurality of conducting wires installed in the insulating plate 412.

As a result of such a configuration, electrical signals having various voltage values and frequencies are input according to the position of the user's finger, thereby causing the user to experience different frictional forces according to the position of his or her finger.

(b) Exemplary Configuration of a String-Shaped Operable Element

FIG. 10B illustrates an exemplary configuration of a string-shaped operable element. The operable element 420 shown in FIG. 10B includes: a conducting wire 421 made of a conducting material; an insulating layer 422 made of an insulating material; and a sensor 423.

An external electrical signal is applied to the conducting wire 421. If the user then drags his or her finger over the insulating layer 422 while the external electrical signal is being applied to the conducting wire 421, a predetermined friction is produced.

The conducting wire 421 and the insulating layer 422 in the configuration shown in FIG. 10B correspond to the electrode sheet 111 and the insulator 112 in the configuration shown in FIG. 2. Although only the operable element 420 is shown in FIG. 10B, processing modules similar to those shown in FIG.

2 are connected to the operable element 420. Such processing modules are realizable by means of a PC, for example.

Factors such as the position and pressure of the user's finger are detected by the sensor 423, with the information detected by the sensor being acquired by an information processing apparatus (PC), for example. The information processing apparatus determines a voltage and frequency in accordance with the acquired sensor information, and then outputs an electrical signal to the conducting wire 421.

When the user's finger is moved over the conducting wire 421 while touching the surrounding insulating layer 422, friction is felt whose magnitude varies according to the electrical signal fed to the conducting wire 421. The user thus experiences unique user interface feedback in the form of unique frictions set by the electrical signals.

Similarly to the configuration described earlier, the voltage and frequency of the electrical signal output from the information processing apparatus (PC) or similar device to the conducting wire 421 may be set to arbitrary values in accordance with factors such as the position, motion, and pressure of the user's finger. Consequently, it is possible, for example, to configure an embodiment such that signals with different set values for voltage and frequency are output according to the position of the user's finger on the insulating layer 422. By inputting electrical signals having various voltage values and frequencies depending on the position of the user's finger, the user is able to experience different frictional forces according to the position of his or her finger.

The foregoing thus describes a plurality of specific exemplary configurations with reference to FIGS. 6 to 10B. As described above, in an embodiment of the present invention, factors such as the position and applied pressure of the user's finger are detected by sensors. On the basis of the information detected by the sensors or motion information derived therefrom, an electrical signal with a modified voltage and frequency (such as an alternating voltage signal) is output to a conducting sheet or conducting wire included in the operable element. As a result, it becomes possible to vary the frictional force in accordance with factors such as the position, motion, and applied pressure of the user's finger, thereby enabling the user to experience diverse user interface feedback.

In an embodiment of the present invention, the operable element may have a two-layer structure made up of a conducting sheet or wire together with an insulator, and may be configured without disposing a large number of electrodes as described earlier with reference to FIG. 1. Consequently, it is possible to miniaturize the configuration and significantly reduce costs. Moreover, the operable element may also be configured having a flexible structure, and may be utilized in a variety of devices.

In an embodiment of the present invention, it is possible to independently modify the voltage and frequency to be applied to the conducting sheet or wire of the operable element, thereby enabling the user to experience a variety of user interface feedback variations.

It is thus possible to appropriately modify the voltage and frequency in accordance with user input conditions such as the position and motion of the user's finger, and in accordance with the information displayed on the operable element. It is thus also possible to provide different user interface feedback depending on the above input conditions or displayed information.

Figure 11:
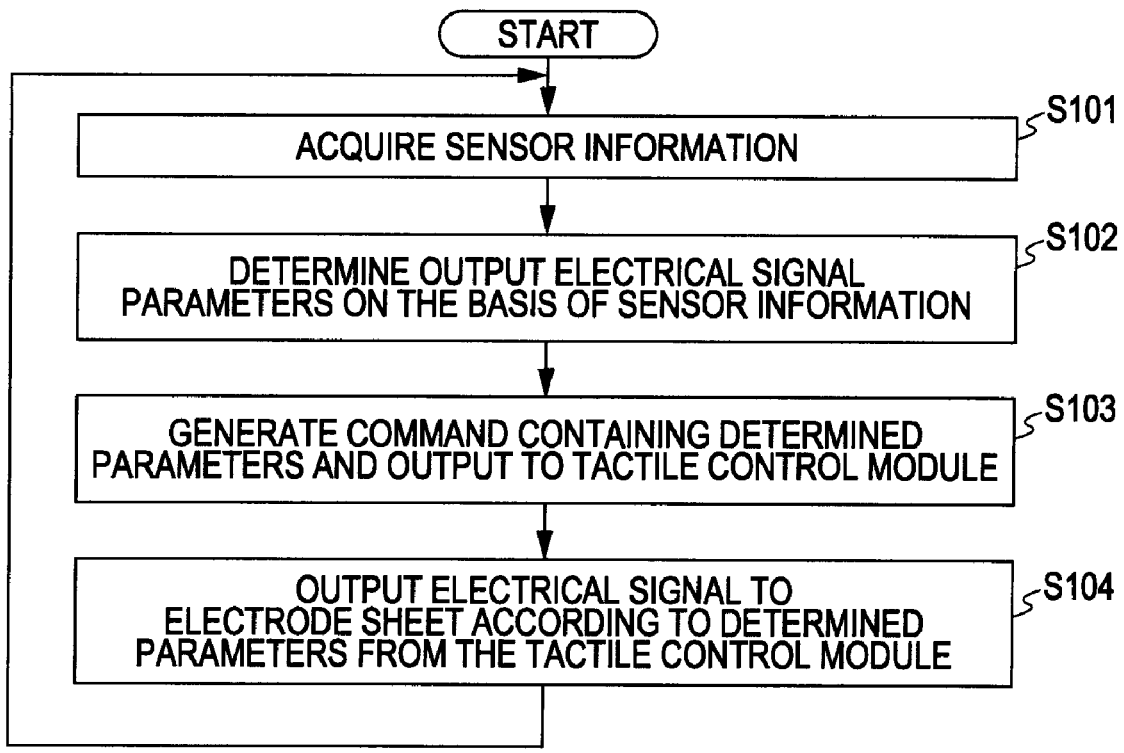
FIG. 11 is a flowchart for explaining a processing sequence executed by a user interface feedback apparatus in accordance with an embodiment of the present invention.

A processing sequence executed in a user interface feedback apparatus in accordance with an embodiment of the present invention will now be described with reference to the flowchart shown in FIG. 11. The processing sequence will be described in relation to the processes executed by the respective processing modules shown in FIG. 2.

First, in step S101 the data acquisition module 123 (see FIG. 2) acquires the sensor information detected by the sensors disposed with respect to the operable element 110. Herein, the sensor information expresses position, pressure, or other information regarding the user's finger. The sensor information may be acquired at regular or intermittent intervals, or when a change occurs.

In step S102, the processing unit 124 (see FIG. 2) acquires the sensor information via the data acquisition module 123 (see FIG. 2), and determines the parameters of the electrical signal to be output to the electrode sheet 111 provided in the operable element 110. The parameters are, for example, the voltage and frequency values for an alternating voltage signal. The processing unit 124 may be configured to reference a table stored in advance in internal memory, for example, when executing the processing to determine the above parameters.

Such a table may store data specifying voltage and frequency values in association with factors such as the position of the user's finger, or in association with images displayed on the operable element, such as switches, sliders, objects, and other categories of elements. The processing unit 124 uses the sensor input and the information stored in the table to determine the above parameters.

In step S103, the processing unit 124 outputs a command containing the determined parameters to the tactile control module 127 (see FIG. 2). In step S104, the tactile control module 127 (see FIG. 2) outputs an electrical signal to the electrode sheet 111 of the operable element 110 in accordance with the parameters contained in the command.

Subsequently, the processing in steps S101 to S104 is repeated. If a change occurs in the sensor information acquired in step S101, then the currently set parameters are modified in step S102, and the electrical signal to be output in step S104 is correspondingly modified. As a result of such modification, the friction with respect to the user's finger is increased or decreased, thereby enabling the user to experience a variety of user interface feedback.

Depending on the acquired sensor information, the output electrical signal may also be terminated. In this case, a command specifying parameters wherein the voltage and frequency values are both equal to zero is output from the processing unit 124 to the tactile control module 127.

Lastly, an exemplary hardware configuration of an apparatus that executes the foregoing processing will be described with reference to FIG. 12. A user interface feedback apparatus in accordance with an embodiment of the present invention is realizable by means of a portable information processing apparatus, for example. More specifically, an embodiment of the present invention is realizable by means of an information processing apparatus having a display that functions as an input/output interface, as described earlier with reference to FIG. 3.

FIG. 12 illustrates an exemplary hardware configuration of such an apparatus. However, the configuration shown in FIG. 12 is merely one example of a hardware configuration for realizing the processing configuration shown by the block diagram in FIG. 2. The configuration shown in FIG. 12 will now be described.

The operable element 711 corresponds to the operable element 110 shown in FIG. 2, and may configured as the display-type operable element shown in FIG. 3, for example. The sensor 721 detects factors such as the position and pressure of the user's finger, with the detected information being acquired via a sensor information acquisition module. The various sensor information is input into the CPU (central processing unit) 701. The CPU 701 then executes the processing of the processing unit of the foregoing embodiment shown in FIG. 2. For example, the form of the electrical signal to be output to the electrode sheet of the operable element in accordance with the sensor information may be determined by means of processing executed according to a program recorded in the ROM 702.

More specifically, parameters such as the voltage and frequency values for an alternating voltage signal are determined. Herein, a table used to determine such parameters may be stored in the memory 714 or the ROM 702, with the CPU 701 determining the parameters by referencing the table. An electrical signal conforming to the determined parameters is then output to the electrode sheet of the operable element 711 via the electrical signal output module 713.

The ROM (read-only memory) 702 stores information such as programs and computational parameters used by the CPU 701. The RAM (random access memory) 703 stores information such as programs executed by the CPU 701, as well as parameters that change during the execution of such programs. The ROM 702 and the RAM 703 are both connected by a host bus 704 realized by means of a CPU or similar bus. The host bus 704 is connected to a bus 706 via a bridge 705.

In addition to the above, the hardware configuration also includes memory 714 made up of components such as a hard disk or flash memory, as well as a communication module 715. It should be appreciated that the exemplary hardware configuration shown in FIG. 12 is merely one example of a user interface feedback apparatus in accordance with an embodiment of the present invention. A user interface feedback apparatus in accordance with an embodiment of the present invention is not limited to the configuration shown in FIG. 12, and other functions may also be provided so long as the processing described in the foregoing embodiment can be executed.

The foregoing thus describes the present invention in detail and with reference to particular embodiments thereof. However, it should be appreciated as obvious to those skilled in the art that modifications and substitutions of the foregoing exemplary embodiments may be made without departing from the spirit and scope of the present invention. In other words, the foregoing discloses the present invention by means of examples, and is not to be interpreted as being limiting. The scope of the present invention is to be determined in conjunction with the attached claims.

In addition, it is possible to execute the series of processes described in the present specification by means of hardware, software, or a compound configuration of both hardware and software. In the case of execution by means of software, a program stating a processing sequence may be installed and executed in the memory of a computer built into special-purpose hardware. Alternatively, the program may be installed and executed on a general-purpose computer capable of executing various processing. For example, the program may be recorded onto a recording medium in advance and then installed onto a computer. In addition, the program may be received via a network such as a LAN (Local Area Network) or the Internet, and then installed to a recording medium such as an internal hard disk.

It should also be appreciated that the various processes described in the present specification are not limited to being executed in a time series following that described herein, but may also be executed in parallel or individually, depending on the processing capability of the apparatus executing the process or other factors. In addition, in the present specification, a system refers to the logical assembly of a plurality of apparatus, and is not limited to respective apparatus being housed in a single physical unit.

The present application contains subject matter related to that disclosed in Japanese Priority Patent Application JP 2008-257629 filed in the Japan Patent Office on Oct. 2, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A user interface feedback apparatus, comprising:
an operable element having a two-layer structure made up of a conductor and an insulator;
a sensor configured to detect, in the form of user contact information, at least a user contact position with respect to the insulator of the operable element;
a processing unit configured to acquire the detected information from the sensor, and determine parameters for an electrical signal to be output to the conductor; and
a tactile control module configured to control the frictional force between the insulator and the user by outputting to the conductor an electrical signal regulated by the parameters determined by the processing unit.

2. The user interface feedback apparatus according to claim 1, wherein
the processing unit determines voltage frequency values for an alternating voltage as the parameters of the electrical signal, and
the tactile control module outputs to the conductor an electrical signal made up of an alternating voltage having the voltage and frequency values determined by the processing unit.

3. The user interface feedback apparatus according to claim 1, wherein
the sensor acquires and provides to the processing unit position information regarding the user contact site, and
the processing unit determines electrical signal parameters in accordance with the position information regarding the user contact site acquired from the sensor.

4. The user interface feedback apparatus according to claim 1, further comprising:
a display module; wherein
the processing unit is configured to determine parameters for the electrical signal according to the relationship between the contact position of the user with respect to the operable element obtained as detected information by the sensor, and an image displayed on the display module.

5. The user interface feedback apparatus according to claim 1, wherein
the sensor acquires and provides to the processing unit pressure information regarding the user contact site, and
the processing unit determines the parameters of the electrical signal in accordance with the pressure information regarding the user contact site acquired from the sensor.

6. The user interface feedback apparatus according to claim 1, wherein
the sensor acquires and provides to the processing unit position information regarding the user contact site, and
the processing unit determines the parameters of the electrical signal in accordance with motion information regarding the user contact site that is obtained on the basis of the position information regarding the user contact site acquired from the sensor.

7. The user interface feedback apparatus according to claim 1, wherein
the operable element is configured as a two-dimensional plane,
the sensor detects the user contact position on the two-dimensional plane in the form of user contact information with respect to the operable element, and
the processing unit determines parameters for an electrical signal to be output to the conductor in accordance with the user contact position on the two-dimensional plane.

8. The user interface feedback apparatus according to claim 1, wherein
the operable element is configured as a one-dimensional element,
the sensor detects the user contact position on the one-dimensional line in the form of user contact information with respect to the operable element, and
the processing unit determines parameters for an electrical signal to be output to the conductor in accordance with the user contact position on the one-dimensional line.

9. The user interface feedback apparatus according to claim 1, wherein
the sensor detects the user contact position according to electrostatic capacitive coupling.

10. The user interface feedback apparatus according to claim 1, wherein
the sensor is configured to include an optical sensor, an electrical sensor, a camera, or a pressure sensor.

11. The user interface feedback apparatus according to claim 1, wherein
the apparatus is earth-grounded in order to make the electrical potential of the user equal to the ground potential.

12. A user interface feedback apparatus, comprising:
an operable element having a many-layered structure made up of a display module, a transparent conductor, and a transparent insulator;
a sensor configured to detect, in the form of user contact information, at least a user contact position with respect to the insulator of the operable element;
a processing unit configured acquire user contact position information in the form of the detected information from the sensor, and determine parameters for an electrical signal to be output to the conductor according to relationship between the user contact position and a display position with respect to the display module; and
a tactile control module configured to control the frictional force between the insulator and the user by outputting to the conductor an electrical signal regulated by the parameters determined by the processing unit.

13. A user interface feedback method executed in an information processing apparatus, the method comprising the steps of:
causing a sensor to detect, in the form of user contact information, at least a user contact position with respect to an insulator constituting part of an operable element having a two-layer structure made up of a conductor and an insulator;
causing a processing unit to acquire the detected information from the sensor, and determine parameters for an electrical signal to be output to the conductor; and
causing a tactile control module to control the frictional force between the insulator and the user by outputting to the conductor an electrical signal regulated by the parameters determined by the processing unit.

14. A non-transitory, computer-readable storage medium storing a program that, when executed by an electronic apparatus, causes the electronic apparatus to perform a method, the method comprising the steps of:
causing a sensor to detect, in the form of user contact information, at least a user contact position with respect to an insulator constituting part of an operable element having a two-layer structure made up of a conductor and an insulator;
causing a processing unit to acquire the detected information from the sensor, and determine parameters for an electrical signal to be output to the conductor; and
causing a tactile control module to control the frictional force between the insulator and the user by outputting to the conductor an electrical signal regulated by the parameters determined by the processing unit.

* * * * *